United States Patent
Ghannam et al.

(10) Patent No.: US 11,454,979 B2
(45) Date of Patent: Sep. 27, 2022

(54) WASHER FLUID LEVEL DETECTION

(71) Applicant: Ford Global Technologies, LLC, Dearborn, MI (US)

(72) Inventors: Mahmoud Yousef Ghannam, Canton, MI (US); Brandon Hicks, Carleton, MI (US); Venkatesh Krishnan, Canton, MI (US); David J. Schmidt, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 744 days.

(21) Appl. No.: 15/907,692

(22) Filed: Feb. 28, 2018

(65) Prior Publication Data
US 2019/0265715 A1  Aug. 29, 2019

(51) Int. Cl.
| | | |
|---|---|---|
| *B60S 1/48* | (2006.01) | |
| *G05D 1/02* | (2020.01) | |
| *G05D 1/00* | (2006.01) | |
| *G01F 23/80* | (2022.01) | |
| *G01S 7/497* | (2006.01) | |

(52) U.S. Cl.
CPC ......... *G05D 1/0225* (2013.01); *G01F 23/802* (2022.01); *G05D 1/0088* (2013.01); *G05D 1/0231* (2013.01); *G01S 7/497* (2013.01); *G01S 2007/4977* (2013.01)

(58) Field of Classification Search
CPC .. G05D 1/0088; G05D 1/0225; G05D 1/0231; B60S 1/0848; B60S 1/56; B60S 1/485; B60S 1/52; B60S 1/54; B60S 1/566; B60S 1/62; B60S 2001/3844; G07C 5/085; G07C 5/006; G07C 5/008; G07C 5/02; G07C 5/0808; G07C 5/816; G07C 5/0825; B08B 1/008; B08B 1/04; B60R 11/04; B60R 11/0232; B60R 11/00; G01F 23/0076; G01F 23/284; G01F 23/2962
See application file for complete search history.

(56) References Cited

U.S. PATENT DOCUMENTS

| | | |
|---|---|---|
| 4,000,835 A | 1/1977 | Bassett et al. |
| 6,236,180 B1 | 5/2001 | Contos et al. |
| 7,073,379 B2 | 7/2006 | Schroth et al. |
| 7,263,417 B2 | 8/2007 | Gutierrez et al. |

(Continued)

FOREIGN PATENT DOCUMENTS

| | | |
|---|---|---|
| DE | 3825630 A1 | 2/1990 |
| DE | 102008021382 A1 | 11/2009 |

(Continued)

OTHER PUBLICATIONS

Non-Final Office Action re U.S. Appl. No. 15/726,341, filed Oct. 5, 2017.

*Primary Examiner* — Hunter B Lonsberry
*Assistant Examiner* — Matthew J. Reda
(74) *Attorney, Agent, or Firm* — Frank A. MacKenzie; Bejin Bieneman PLC

(57) ABSTRACT

A system includes a processor and a memory. The memory stores instructions executable by the processor to, upon determining that a first fluid level in a vehicle container is below a threshold based on fluid level sensor data, determine a second fluid level based on a fluid consumption signal and the fluid level sensor, and to navigate the vehicle based on the determined second fluid level.

10 Claims, 5 Drawing Sheets

(56) References Cited

U.S. PATENT DOCUMENTS

| | | |
|---|---|---|
| 9,126,534 B2 | 9/2015 | Snider |
| 9,278,670 B2 | 3/2016 | Hattori et al. |
| 9,520,006 B1 | 12/2016 | Sankovsky et al. |
| 10,042,359 B1 | 8/2018 | Konrardy et al. |
| 2012/0101704 A1* | 4/2012 | Wagner ............... G01S 7/52004 701/96 |
| 2014/0270379 A1* | 9/2014 | Snider ....................... B60R 1/00 382/104 |
| 2015/0206359 A1* | 7/2015 | Ahmad ............ B60K 15/03006 701/34.4 |
| 2016/0139600 A1* | 5/2016 | Delp ........................ B67D 7/04 701/26 |
| 2016/0186648 A1* | 6/2016 | Rollinger .................. F02D 1/00 123/41.15 |
| 2016/0244028 A1 | 8/2016 | Wakatski |
| 2018/0293818 A1* | 10/2018 | Linsmeier ............ G07C 5/0825 |
| 2018/0321071 A1* | 11/2018 | Larsen .................. B60K 15/00 |
| 2019/0161035 A1* | 5/2019 | Salter ................. B60R 16/0232 |

FOREIGN PATENT DOCUMENTS

| | | |
|---|---|---|
| DE | 102009039145 A1 | 3/2011 |
| DE | 102015210312 A1 | 12/2016 |
| DE | 102015223557 A1 | 6/2017 |
| DE | 102016206129 A1 | 10/2017 |
| WO | 2017095913 A1 | 6/2017 |

\* cited by examiner

WASHER FLUID LEVEL DETECTION

BACKGROUND

A vehicle may include one or more object detection sensors such as Light Detection and Ranging (LIDAR) sensors to detect objects, e.g., in an area outside the vehicle. A sensor for detecting objects outside a vehicle may be mounted to a vehicle exterior. For example, a sensor may be mounted to a vehicle roof, pillar, etc. A sensor such as a LIDAR sensor is typically subject to environmental conditions, e.g., dirt, dust, etc., that can impair operation of the sensor. Sensor cleaning systems may be provided so that lenses, windshield, etc. are maintained to provide a clear field of view for sensors and/or occupants. However, it is a problem that such a cleaning system may not be available, e.g., in a state to provide cleaning to allow sensor operation that in turn allows safe and efficient vehicle operation.

DETAILED DESCRIPTION

Introduction

Figure 1:
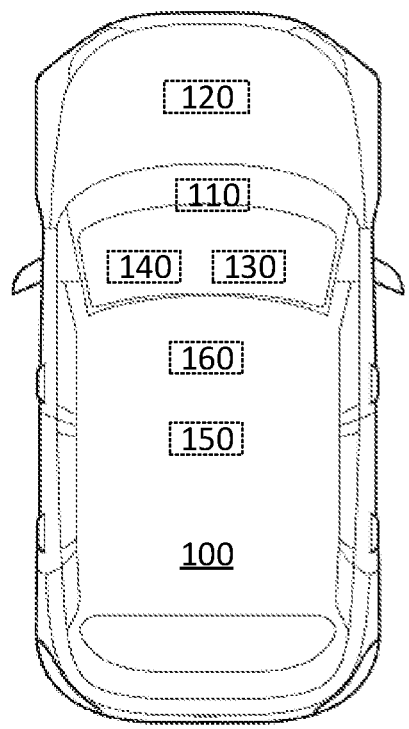
FIG. 1 is a diagram illustrating an example vehicle.

Disclosed herein is a system including a processor and a memory. The memory stores instructions executable by the processor to, upon determining that a first fluid level in a vehicle container is below a threshold based on fluid level sensor data, determine a second fluid level based on a fluid consumption signal and the fluid level sensor, and to navigate the vehicle based on the determined second fluid level.

The instructions may include further instructions to determine that the first fluid level is below the threshold further based on data describing vehicle motion.

The instructions may include further instructions to apply a filter to the fluid level sensor data, wherein a filter parameter is based on the vehicle motion data including a vehicle acceleration and a vehicle yaw rate, and to determine that the container contains a predetermined volume of fluid upon determining based on the filtered data that the first fluid level is below the threshold.

The filtered data may omit disturbances of fluid level caused by the vehicle motion.

The data describing the vehicle motion may include a vehicle speed.

The instructions include further instructions to determine a leak in the container upon simultaneously determining a lack of fluid consumption and determining that the first fluid level in the container has changed from a first value above the threshold to a second value below the threshold, and to navigate the vehicle to a service center.

The instructions may include further instructions to determine the lack of fluid consumption upon determining at least one of a fluid pump is deactivated and a request for cleaning is deactivated.

The instructions may include further instructions to determine the second fluid level upon determining, based on the fluid consumption signal, at least one of a fluid pump is activated and a request for cleaning is activated.

The instructions may include further instructions to determine a predetermined volume of fluid at the first fluid level based on a location of the fluid level sensor, to determine a discharged volume of fluid based at least in part on the fluid consumption signal, and to determine the second fluid level based on the predetermined volume of fluid at the first fluid level and the determined discharged volume of fluid.

The fluid consumption signal may include at least one of a number of cleaning cycles and a duration of an actuation of a fluid pump.

The instructions may include further instructions to determine the discharged volume of fluid based at least in part on one of a predetermined flow rate of a fluid pump and a predetermined consumed fluid volume per each cleaning cycle.

The instructions include further instructions to determine a critical fluid threshold based on at least one of a vehicle route and a weather condition, and to perform an action upon determining that the second fluid level is below the critical threshold.

Further disclosed herein is a method including, upon determining that a first fluid level in a vehicle container is below a threshold based on fluid level sensor data, determining a second fluid level based on a fluid consumption signal and the fluid level sensor, and navigating the vehicle based on the determined second fluid level.

The method may further include determining that the first fluid level is below the threshold further based on data describing vehicle motion.

The method may further include determining a leak in the container upon simultaneously determining a lack of fluid consumption and determining that the first fluid level in the container has changed from a first value above the threshold to a second value below the threshold, and navigating the vehicle to a service center.

The method may further include determining the second fluid level upon determining, based on the fluid consumption signal, at least one of a fluid pump is activated and a request for cleaning is activated.

The method may further include determining a predetermined volume of fluid at the first fluid level based on a location of the fluid level sensor, determining a discharged volume of fluid based at least in part on the fluid consumption signal, and determining the second fluid level based on the predetermined volume of fluid at the first fluid level and the determined discharged volume of fluid.

The method may further include determining the discharged volume of fluid based at least in part on one of a predetermined flow rate of a fluid pump and a predetermined consumed fluid volume per each cleaning cycle.

Further disclosed herein is a system including means for determining a second fluid level based on a fluid consumption signal and a fluid level sensor upon determining that a first fluid level in a vehicle container is below a threshold based on fluid level sensor data, and means for navigating the vehicle based on the determined second fluid level.

The system may further include means for determining a predetermined volume of fluid at the first fluid level based on a location of the fluid level sensor, means for determining a discharged volume of fluid based at least in part on the fluid consumption signal, and means for determining the second fluid level based on the predetermined volume of fluid at the first fluid level and the determined discharged volume of fluid.

Further disclosed is a computing device programmed to execute any of the above method steps.

Yet further disclosed is a computer program product, comprising a computer readable medium storing instructions executable by a computer processor, to execute any of the above method steps.

Exemplary System Elements

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as a vehicle network, communication bus, etc. A LIDAR sensor 130 attached to a vehicle 100 exterior, e.g., on a roof, pillar, etc., of the vehicle 100, may provide object data by which the computer 110 can make determinations including relative locations, sizes, and shapes of objects such as other vehicles surrounding the vehicle 100. A vehicle 100 computer 110 may receive the object data and operate the vehicle in an autonomous and/or semi-autonomous mode based at least in part on the received object data. Additionally, the vehicle 100 may include one or more fluid level sensors 130, as discussed below with reference to FIG. 2.

The HMI 140 may be configured to receive user input, e.g., during operation of the vehicle 100. For example, a user may select a mode of operation, e.g., an autonomous mode, by inputting a requested mode of operation via the HMI 140. Moreover, the HMI 140 may be configured to present information to the user. Thus, the HMI 140 may be located in a passenger compartment of the vehicle 100.

The vehicle 100 may include a cleaning system including a washer fluid reservoir, e.g., a container 150, and a fluid pump 160 fluidly connected to the container 150. The computer 110 may be programmed to actuate a fluid valve or a fluid pump 160 to actuate spraying the washer fluid, e.g., via a nozzle, to a sensor 130 screen, a windshield, etc. The fluid pump 160 may include an electric motor that can be actuated to pump the washer fluid based on a signal received from the vehicle 100 computer 110. The pump 160 and/or the valve may include an electrical actuator, e.g., a solenoid valve, an electric motor, etc., that can be actuated by the vehicle 100 computer 110 to turn on and/or off.

Figure 2:
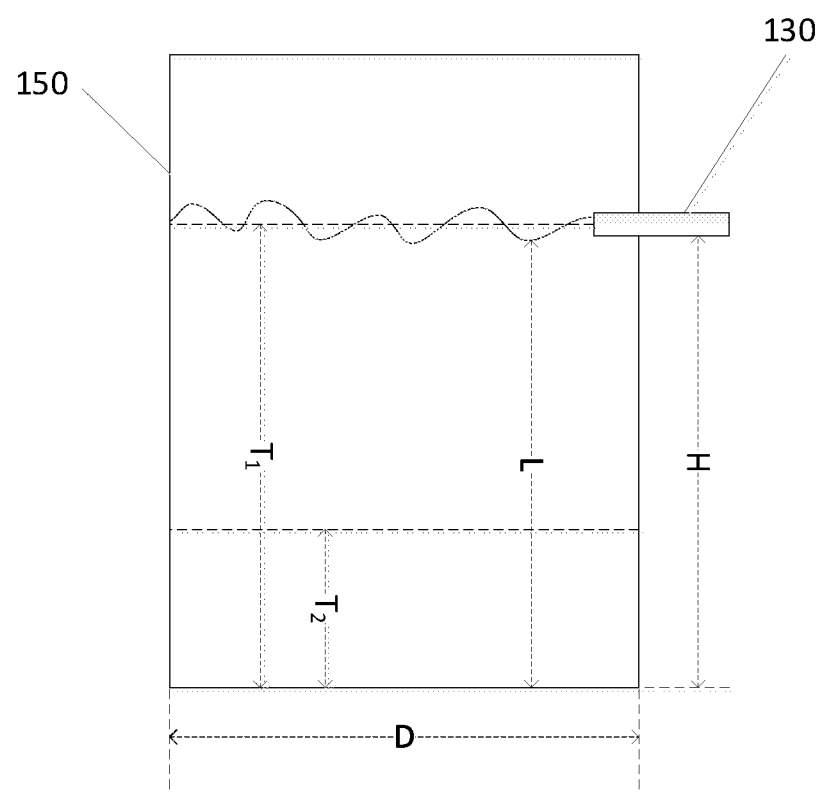
FIG. 2 is a diagram showing a washer fluid container of the vehicle of FIG. 1.

FIG. 2 shows an example washer fluid container 150. The container 150 may have a cylindrical shape with a diameter D. Alternatively, the container 150 may have some other shapes such as a frustum shape or an irregular shape. The container 150 may be formed of plastic, metal, etc.

A fluid level sensor 130 may be mounted to the container 150 at a height H from a bottom of the container 150. The fluid level sensor 130 may be configured to determine whether a fluid level L is below a level threshold $T_1$.

In one example, the fluid level sensor 130 may include a conductance measuring sensor. The computer 110 may be programmed to determine whether the level L is below the threshold $T_1$ upon determining that a conductivity measured by the level sensor 130 exceeds a predetermined threshold, e.g., 1000 Ohm. Such level sensor 130 may operate based on using a slightly conductive fluid in the container 150. Thus, when the fluid level L drops below the threshold $T_1$, the sensor 130 measures a conductivity of air which exceeds the predetermined threshold, whereas a conductivity of slightly conductive fluid is less than the predetermined threshold.

As another example, the fluid level sensor 130 may include a Reed switch and an electromagnetic component that floats on the fluid inside the container 150. The computer 110 may be programmed to determine that the fluid level L has dropped below the threshold $T_1$ upon an electromagnetic activation or deactivation of the Reed sensor. Additionally or alternatively, the level sensor 130 may include a capacitive, and/or any other type of level measuring sensor 130 that determines whether the fluid level L is above or below a predetermined threshold $T_1$.

Figure 3:
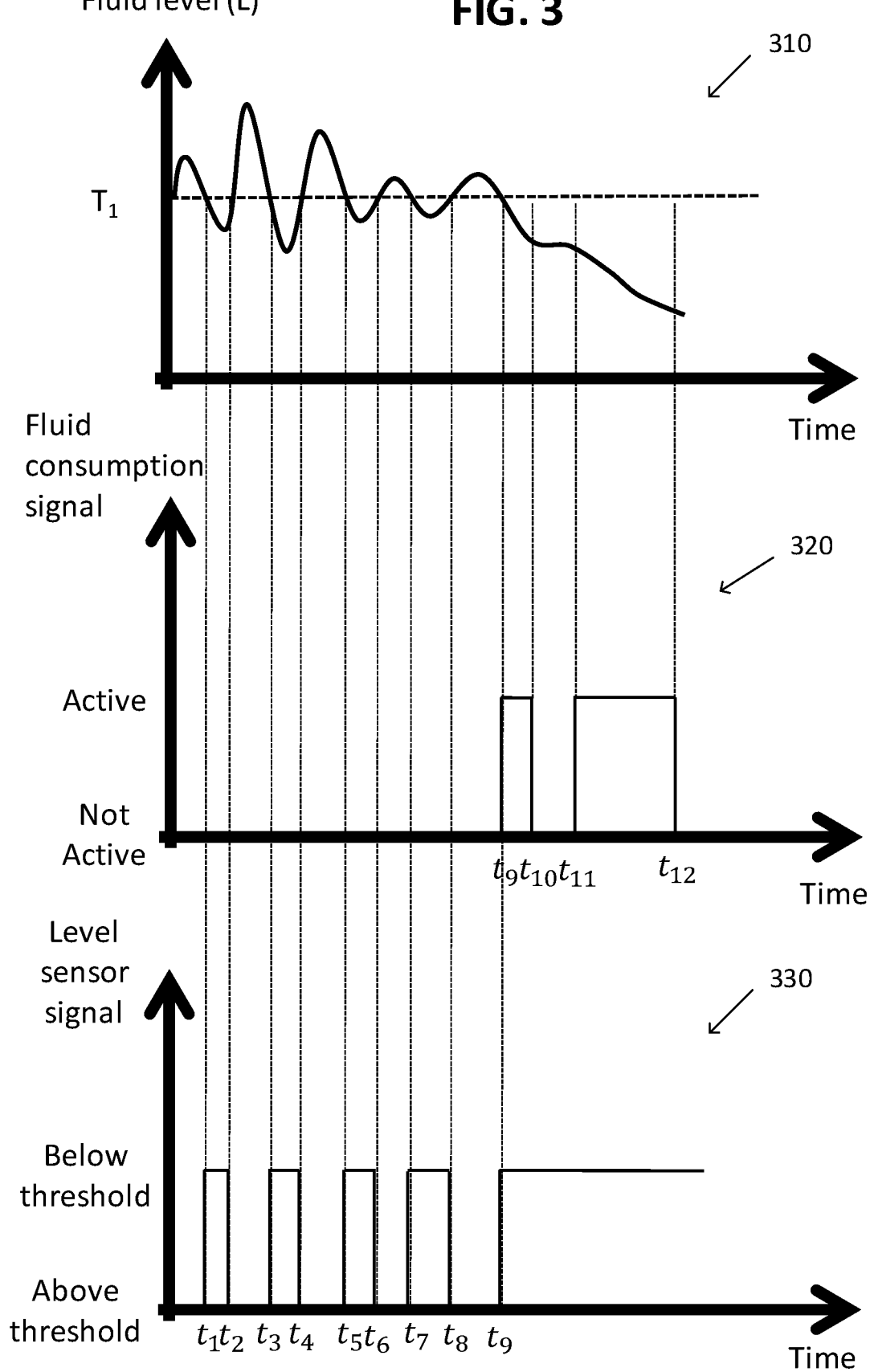
FIG. 3 illustrates exemplary graphs for a fluid level in the container, a fluid consumption signal, and a level sensor signal.

FIG. 3 shows an example graph 310 of a fluid level in the container 150. An amount of the signal in the graph 310 indicates a volume, level, etc. of the fluid in the container 150. For example, the graph may show a height (or depth) of the fluid in the container 150, e.g., in centimeters, and/or a volume of the fluid in the container 150, e.g., in milliliters (mL). The graph 310 of FIG. 3 illustrates disturbances of the fluid level L, e.g., from time 0 (zero) until time $t_9$, which may have been resulted from vehicle 100 motion, e.g., acceleration, deceleration, etc.

FIG. 3 shows an example graph 320 of a fluid consumption signal. In one example, the consumption signal may be a binary signal having an "active" and a "not-active" state. "Active" means the fluid is being currently dispensed based on an actuation of the computer 110, e.g., upon detection of a sensor 130 screen blockage, an occupant request, etc., whereas "not-active" means the fluid pump 160 is not actuated. Additionally or alternatively, the consumption signal may include a request for cleaning, e.g., received from a second computer 110, the HMI 140, etc. Additionally or alternatively, the consumption signal may be received from a flow rate signal that provides information including whether there is a flow of fluid through, e.g., a fluid hose connecting an outlet of the container 150, to a nozzle. Additionally or alternatively, although not shown in the graph 320 of FIG. 3, the fluid consumption signal may be a non-binary numeric value, e.g., including a numeric value of a flow rate in a milliliter per second (mL/s) unit. Thus, a non-zero value of a non-binary consumption signal may correspond to the binary state of "active," whereas a 0 (zero) value of a non-binary consumption signal may correspond to the not-active state of the binary consumption signal. As the graph 320 of FIG. 3 shows, the consumption signal is activated from a time $t_9$ to a time $t_{10}$ and from a time $t_{11}$ to a time $t_{12}$. The graph 310 of FIG. 3 illustrates a drop of fluid level during the times $t_9$ to $t_{10}$ and the times $t_{11}$ to $t_{12}$, which maybe resulted from the consumption of fluid as shown in FIG. 3B.

FIG. 3 shows an example graph 330 for fluid level sensor 130 signal. The level sensor 130 may outputs a binary signal indicating whether the fluid level L is above or below the threshold $T_1$. As shown in FIG. 2, the threshold $T_1$ is specified based on a location of the level sensor 130. In one example, the container 150 has a cylindrical shape and the level sensor 130 may be mounted at an 80% height of the container. Thus, the level sensor 130 signal may provide information indicating whether the fluid level is above or below the threshold of 80%, e.g., whether a volume of fluid is more or less than 80% of a capacity of the container 150. Alternatively, the level sensor 130 signal may be activated upon detecting that the fluid level is above the threshold $T_1$.

As shown in the graph 330 of FIG. 3, the fluid level signal is activated at time $t_9$, which may correspond to the fluid consumption as shown in the graph 320 of FIG. 3 and the fluid drop as shown in the graph 310 of FIG. 3. The fluid level signal may stay active until the container 150 is refilled with the fluid. The graph 330 of FIG. 3 further shows disturbances of the fluid level signal between times $t_1$ and $t_8$ that correspond to disturbances in the fluid level L of the container 150. For example, such disturbances may be resulted from vehicle 100 motion, e.g., deceleration, acceleration, etc., which may cause a false detection of the fluid level L. Additionally, after the fluid level L drops below the threshold $T_1$, the level sensor 130 may not provide further information about how much of the fluid is left in the container 150 because the sensor 130 may be configured to provide information that is limited to whether the fluid level L is below or above the fluid threshold $T_1$.

The vehicle 100 computer 110 can be programmed to, upon determining that a first fluid level L in the vehicle 100 container 150 is below a threshold $T_1$ based on fluid level sensor 130 data, determine a second fluid level L based on a fluid consumption signal and the fluid level sensor 130, and to navigate the vehicle 100 based on the determined second fluid level L. Thus, advantageously, the computer 110 can determine the second level of fluid although the level sensor 130 may only provide information including whether the fluid level L is below the threshold $T_1$. In other words, although the fluid level sensor 130 may provide binary data that the fluid level L is above or below the threshold $T_1$, the computer 110 can determine the second fluid level L which is below the threshold $T_1$ based on the fluid consumption signal.

The computer 110 may be programmed to determine a predetermined volume $V_{init}$ of fluid at the first fluid level L based on a location of the fluid level sensor 130, to determine a discharged volume $V_{dis}$ of fluid based at least in part on the fluid consumption signal, and to determine the second fluid level L based on the predetermined volume $V_{init}$ of fluid at the first fluid level L and the determined discharged volume $V_{dis}$ of fluid.

The computer 110 may be programmed to determine the predetermined volume $V_{init}$ based on the location of the fluid level sensor 130, e.g., stored in a computer 110 memory. In one example, the stored information may include a predetermined volume, e.g., 3600 mL. Thus, the computer 110 can be programmed to determine that the container 150 contains 3600 mL, upon determining that the fluid level L dropped below the threshold $T_1$.

The computer 110 may be programmed to determine the second fluid level L upon determining, based on the fluid consumption signal, that the fluid pump 160 is activated and/or a request for cleaning is activated. Thus, upon determining the predetermined volume $V_{init}$ in the container 150 based on the sensor level signal 130, the computer 110 can be programmed to determine any further drop of the fluid level L based on the consumption signal. The fluid consumption signal may include a number of cleaning cycles and a duration of an actuation of the fluid pump 160. The computer 110 may be programmed to determine the discharged volume $V_{dis}$ of fluid based at least in part on one of a predetermined flow rate of the fluid pump 160 and a predetermined consumed fluid volume per each cleaning cycle. The computer 110 may be programmed to determine a second fluid level or a current volume V left in the container based on operation (1) below. Parameters t and Q represent a duration of time that the fluid pump 160 was activated and the flow rate of the pump 160 respectively. For example, the computer 110 may determine that the second level L of the fluid is at 3500 mL, upon determining that the fluid pump 160 was activated for 10 seconds and the flow rate of the pump is 10 mL/sec.

$$V = V_{init} - t \times Q \quad (1)$$

Additionally or alternatively, the computer 110 may be programmed to determine the second fluid level L based on the predetermined consumed fluid volume per each cleaning cycle. For example, the computer 110 may be programmed to determine that the second fluid level L is at 3500 mL, upon determining that the fluid pump 160 was activated for 2 (two) cycles and each cycle consumes 50 mL of the fluid.

The computer 110 may be further programmed to update the predetermined fluid volume $V_{init}$, as the fluid is being consumed, and to store the updated Vinit in the computer 110 memory. Thus, with reference to the example above, upon determining the second fluid level L at 3500 mL, the computer 110 may update the Vinit to be 3500 mL. Thus, the computer 110 may be programmed to determine any further drop of the fluid level L based on a most recent updated volume $V_{init}$. For example, with reference to the graph 320 of FIG. 3, the computer 110 may be programmed to update the predetermined fluid volume $V_{init}$, upon each stoppage of fluid consumption, e.g., at times $t_{10}$, $t_{12}$.

TABLE 1

| Type of road | Weather condition | Estimated use (mL/km) |
|---|---|---|
| Local road | Normal | 0.1 |
| Local road | Sensor detection range below a distance threshold, e.g., 50 meters | 10 |
| Freeway | Normal | 0.2 |
| Freeway | Sensor detection range below a distance threshold, e.g., 50 meters | 30 |

The computer 110 may be programmed to determine a critical fluid threshold $T_2$ based on at least one of a vehicle 100 route and a weather condition, and to perform an action upon determining that the second fluid level L is below the critical fluid threshold $T_2$. For example, the computer 110 may be programmed to estimate a volume $V_{est}$ of the fluid expected to be consumed based on the vehicle 100 route and/or the weather condition. In one example, the computer 110 may be programmed to store information in a table, e.g., Table 1, including typical usage volume per kilometer and based on the weather condition. As one example, Table 1 specifies a weather condition based on an effect of weather, e.g., rain, snow, fog, etc. on a vehicle 100 sensor 130 detection range. An example weather condition such as inclement weather is defined when a detection range of sensor(s) 130 is less than a distance threshold, e.g., 50 meters.

The computer 110 may be programmed to determine a vehicle 100 route to a vehicle 100 destination, using known route planning techniques, and to estimate the volume $V_{est}$ of fluid for the determined vehicle 100 route. The computer 110 may be programmed to set the second threshold $T_2$ based on the estimated volume of fluid for the vehicle 100 route, e.g., equal to the estimated volume of fluid. For example, the computer 110 may be programmed to determine the estimated volume $V_{est}$, e.g., 1500 mL, for the vehicle 100 route, and to then set the second threshold $T_2$ at 1500 mL. Thus, at least a volume of 1500 mL is expected to be available in the container 150 for the determined vehicle 100 route. The computer 110 may be programmed to navigate the vehicle 100 to, e.g., a service center, gas station, etc. to fill up the fluid container 150, upon determining that the second fluid level L is below the critical threshold $T_2$. Additionally or alternatively, the computer 110 may be programmed to determine the estimated volume $V_{est}$ for the vehicle 100 route and the second critical threshold $T_2$ based on any other technique.

As shown in the graph 310 of FIG. 3, the fluid level L may fluctuate as a result of the vehicle 100 motion. The computer 110 may be programmed to determine that the first fluid level L is below the threshold $T_1$ further based on data describing vehicle 100 motion. The data describing the vehicle 100 motion may include a vehicle 100 acceleration and a vehicle 100 yaw rate. For example, the computer 110 may be programmed to apply a filter to the fluid level sensor 130 data, wherein a filter parameter is based on the vehicle 100 motion data including a vehicle 100 acceleration and a vehicle 100 yaw rate, and to determine that the container 150 contains the predetermined volume of fluid upon determining based on the filtered data that the first fluid level is below the threshold. The filtered data can omit disturbances of fluctuations of a fluid level L caused by the vehicle 100 motion.

In one example, the filter may be a low pass filter. A filter parameter based on the vehicle motion may include a filter cutoff frequency. A "cutoff" frequency is a threshold in a filter frequency response at which, a low-pass filter begins to pass signals though rather than attenuating them. Typically, a power level for the cutoff frequency is at a threshold of 3 db (decibel), i.e., where signal power drops to half of its mid band power.

TABLE 2

| Cutoff frequency (Hz) | Vehicle speed range (Km/h) |
|---|---|
| 5 Hz | Below 20 |
| 3 Hz | 20 to 40 |
| 1 Hz | Greater than 40 |

Table 2 shows various example cutoff frequencies and vehicle 100 speed ranges associated with each of the cutoff frequencies. The computer 110 may be programmed to select the cutoff frequency of the low-pass filter based on the vehicle 100 speed as shown in Table 2. As shown in Table 2, the cutoff frequency may decrease as the vehicle 100 speed increases. Thus, disturbances resulted from increased speed may be filtered out via lower cutoff frequency. Additionally or alternatively, the computer 110 may be programmed to determine a filter parameter, e.g., the cutoff frequency, a gain, etc., based on other motion data such as yaw rate, acceleration, speed, etc. In other words, the computer 110 may store a table including relationships between (i) cutoff frequencies, and (ii) ranges of values including one or more of speed, acceleration, and/or yaw rate of the vehicle 100.

As another example filter for the level sensor 130 signal, the computer 110 may be programmed to determine a "debounce" timer. A "debounce" timer typically includes a hardware and/or software implementation to delay an acceptance of a change in a state of a binary signal to ensure the change is stable (i.e., not transitory, e.g., because of disturbances resulted from positive or negative acceleration, e.g., a vehicle 100 braking operation). The computer 110 may be programmed to accept a change in the state of the level sensor 130 signal upon after a predetermined debounce time, e.g., 3 seconds, has elapsed. The computer 110 may be programmed to reset the debounce timer upon each change of the state of the level sensor 130. For example, if the sensor 130 signal changes from not-active to active for a duration of 2.8 seconds, the computer 110 may not accept the change, i.e., in this example the computer 110 determines the level sensor 130 signal to be not-active. However, if the level sensor 130 signal changes from not-active to active and stays active for 3 seconds, then in this example the computer 110 determines the state of the level sensor 130 to be active. Thus, advantageously transient changes of sensor 130 signal resulted from the disturbances may be filtered out. Additionally or alternatively, the computer 110 may be programmed to adjust the predetermined debounce time based on the vehicle 100 motion data. For example, the computer 110 may be programmed to increase the debounce time as the vehicle 100 speed, acceleration, etc. increase. Thus, advantageously, the computer 110 may better filter out the increased disturbances resulted from increased speed, acceleration, yaw rate, etc. The computer 110 may be programmed to adjust the debounce time based on a table stored in the computer 110 memory.

As discussed above, the computer 110 may be programmed to determine the predetermined fluid volume $V_{init}$ based on determining a drop of fluid level L below the threshold $T_1$. The fluid containers 150 may have a leak causing a loss of, e.g., washer fluid, which is likely to impair a vehicle 100 operation.

The computer 110 may be programmed to identify a leak in the container 150 at a time when the computer 110 identifies a lack of fluid consumption (i.e., fluid is not being consumed), also, at the same time, determines that the first fluid level L in the container 150 has changed from a first value above the threshold $T_1$. The computer 110 may further be programmed, upon making these determinations, to a second value below the threshold $T_1$, and to navigate the vehicle to a service center, e.g., to repair the leak. The computer 110 may be programmed to determine or identify the lack of fluid consumption upon determining that a fluid pump 160 is deactivated and/or a request for cleaning is deactivated. In other words, if the computer 110 may be programmed to detect a leak in the container 150 and/or fluid pipes, etc. upon determining that the fluid level L drops as there is no consumption of the fluid.

Processing

Figure 4A:
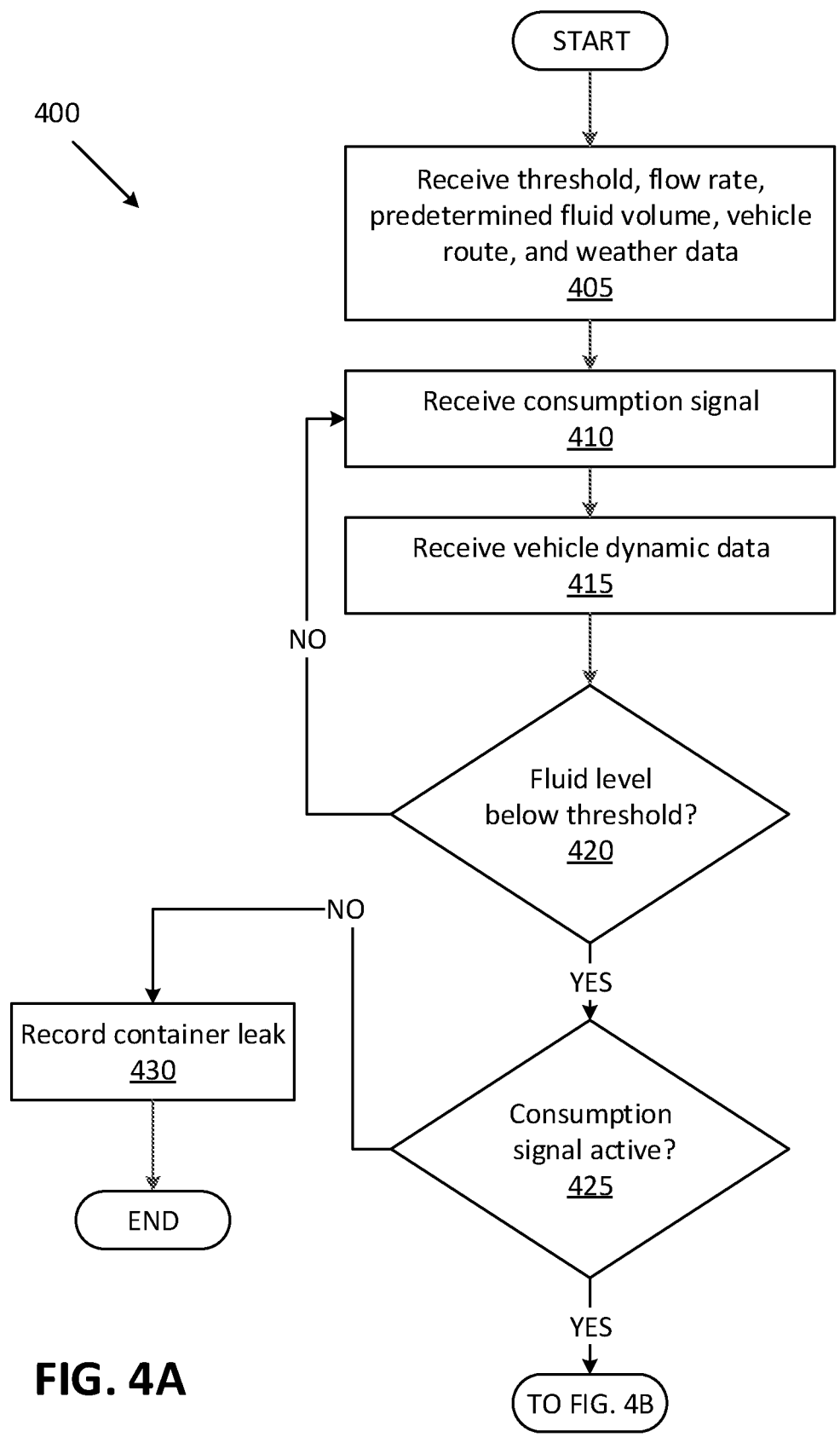
FIGS. 4A-4B illustrate a flowchart of an exemplary process for operating a cleaning system.
Figure 4B:
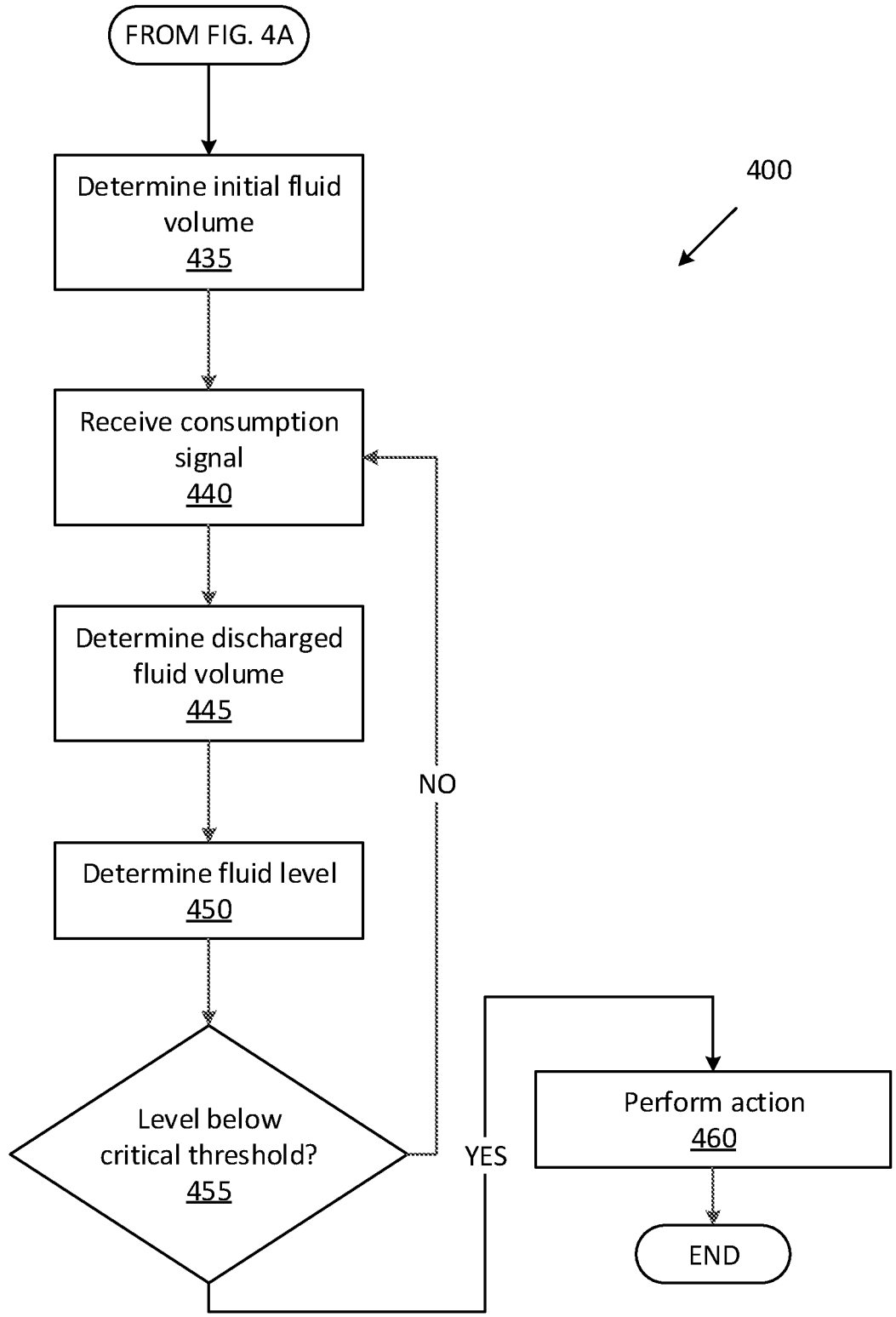

FIGS. 4A-4B illustrate a flowchart of an exemplary process 400 for operating the cleaning system. The vehicle 100 computer 110 may be programmed to execute blocks of the process 400.

With reference to FIG. 4A, the process 400 begins in a block 405, in which the computer 110 receives data including the threshold $T_1$, a flow rate Q of the pump 160, a predetermined fluid volume $V_{init}$ at the threshold $T_1$, and a vehicle 100 route. The computer 110 may store the received data in a computer 110 memory.

Next, in a block 410, the computer 110 receives fluid consumption signal.

Next, in a block 415, the computer 110 receives the vehicle 100 motion data. The vehicle 100 motion data may include a vehicle 100 speed, acceleration, yaw rate, etc.

Next, in a decision block 420, the computer 110 determines whether the fluid level L is below the threshold $T_1$. The computer 110 may be programmed to determine whether the fluid level L is below the threshold $T_1$ based on the fluid level signal received from the level sensor 130. Additionally, the computer 110 may be programmed to apply a filter to the received data from the fluid level sensor 130 and to determine whether the fluid level L is below the threshold $T_1$ based on the filtered data. If the computer 110 determines that the fluid level L is below the threshold $T_1$, then the process 400 proceeds to a decision block 425; otherwise the process 400 returns to the block 410.

In the decision block 425, the computer 110 determines whether the consumption signal is "active." The computer 110 may be programmed to determine whether the status of the consumption signal is "active" or the consumption signal has a value above zero. If the computer 110 determines that the consumption signal is "active," then the process 400 proceeds to a block 435 (see FIG. 4B); otherwise the process 400 proceeds to a block 430.

In the block 430, the computer 110 determines a leak of the container 150 and records the leak, e.g., in a computer 110 memory. Additionally or alternatively, the computer 110 may be programmed to navigate the vehicle 100 by actuating vehicle 100 propulsion, steering, and/o braking to a new destination, e.g., a service center. Following the block 430, the process 400 ends, or alternatively, returns to the block 405, although not shown in FIG. 4A.

With reference to FIG. 4B, in the block 435, the computer 110 determines an initial fluid volume, i.e., determines that a volume of fluid in the container 150 is the predetermined volume $V_{init}$.

Next, in a block 440, the computer 110 receives the consumption signal.

Next, in a block 445, the computer 110 determines a discharged fluid volume $V_{dis}$. For example, the computer 110 may be programmed to determine the discharged fluid volume $V_{dis}$ based on the fluid rate Q and a duration time of consuming the fluid, e.g., actuating the pump 160.

Next, in a block 450, the computer 110 determines the fluid level L based on the initial fluid volume $V_{init}$ and the discharged volume $V_{dis}$. Additionally, the computer 110 may be programmed to update the predetermined fluid volume $V_{init}$ upon stoppage of fluid consumption to be at the current level and store the updated $V_{init}$ in the computer 110 memory.

Next, in a decision block 455, the computer 110 determines whether the fluid level L is below a critical threshold $T_2$. The computer 110 may be programmed to determine the critical fluid threshold $T_2$ based on at least one of a vehicle 100 route and a weather condition. If the computer 110 determines that the fluid level L is below the critical threshold $T_2$, then the process 400 proceeds to a block 460; otherwise the process 400 returns to the block 440.

In the block 460, the computer 110 performs an action. The computer 110 may be programmed to navigate the vehicle 100 by actuating a vehicle 100 propulsion, steering, and/or braking to a new destination, e.g., a gas station, etc. to refill the fluid. Additionally or alternatively, the computer 110 may be programmed to output a message to the vehicle 100 HMI 140 to inform a vehicle 100 occupant about a likelihood of running out of the fluid during the planned vehicle 100 route.

Following the block 460, the process 400 ends, or alternatively, returns to the block 405, although not shown in FIG. 4B.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   upon determining that a first fluid level in a vehicle container is below a threshold based on fluid level sensor data,
   determine a leak in the container upon simultaneously determining a lack of fluid consumption and determining that the first fluid level in the container has changed from a first value above the threshold to a second value below the threshold and that a request for cleaning is deactivated; and
   navigate the vehicle based on the determined leak.

2. The system of claim 1, wherein the instructions include further instructions to determine that the first fluid level is below the threshold further based on data describing vehicle motion.

3. The system of claim 2, wherein the instructions include further instructions to:
   apply a filter to the fluid level sensor data, wherein a filter parameter is based on the vehicle motion data including a vehicle acceleration and a vehicle yaw rate; and
   determine that the container contains a predetermined volume of fluid upon determining based on the filtered data that the first fluid level is below the threshold.

4. The system of claim 3, wherein the filtered data omits disturbances of fluid level caused by motion of the vehicle.

5. The system of claim 3, wherein the data describing the vehicle motion include a vehicle speed.

6. The system of claim 1, wherein the instructions include further instructions to determine a second fluid level upon determining, based on the fluid consumption signal, at least one of a fluid pump is activated and the request for cleaning is activated.

7. The system of claim 6, wherein the instructions include further instructions to:
   determine a critical fluid threshold based on at least one of a vehicle route and a weather condition; and
   perform an action upon determining that the second fluid level is below the critical threshold.

8. The system of claim 6, wherein the instructions include further instructions to:
   determine a predetermined volume of fluid at the first fluid level based on a location of the fluid level sensor;
   determine a discharged volume of fluid based at least in part on the fluid consumption signal; and
   determine the second fluid level based on the predetermined volume of fluid at the first fluid level and the determined discharged volume of fluid.

9. The system of claim 8, wherein the fluid consumption signal includes at least one of a number of cleaning cycles and a duration of an actuation of a fluid pump.

10. The system of claim 8, wherein the instructions include further instructions to determine the discharged volume of fluid based at least in part on one of a predetermined flow rate of a fluid pump and a predetermined consumed fluid volume per each cleaning cycle.

* * * * *